(12) United States Patent
Yamamoto et al.

(10) Patent No.: US 8,237,843 B2
(45) Date of Patent: Aug. 7, 2012

(54) IMAGING DEVICE

(75) Inventors: Kenji Yamamoto, Kanagawa (JP); Isao Ichimura, Tokyo (JP); Kengo Hayasaka, Tokyo (JP); Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 12/757,520

(22) Filed: Apr. 9, 2010

(65) Prior Publication Data

US 2010/0265381 A1 Oct. 21, 2010

(30) Foreign Application Priority Data

Apr. 16, 2009 (JP) ................. P2009-100187

(51) Int. Cl.
*H04N 5/225* (2006.01)
*G02B 13/16* (2006.01)
*G02B 27/10* (2006.01)
(52) U.S. Cl. ......... 348/340; 348/335; 359/619; 359/620
(58) Field of Classification Search .................. 348/214, 348/241, 251, 335, 340; 359/619–628
See application file for complete search history.

(56) References Cited

U.S. PATENT DOCUMENTS

2008/0266655 A1* 10/2008 Levoy et al. ............... 359/368
2009/0122175 A1* 5/2009 Yamagata ................. 348/335

FOREIGN PATENT DOCUMENTS

WO 2006-039486 4/2006

OTHER PUBLICATIONS

Ren. Ng., et al., "Light Field Photography with a Hand-Held Plenoptic Camera", Sandford Tech Report CTSR Feb. 2005.

* cited by examiner

*Primary Examiner* — John Villecco
*Assistant Examiner* — Mark Monk
(74) *Attorney, Agent, or Firm* — K&L Gates LLP (57) ABSTRACT

Disclosed herein is an imaging device, including: an imaging lens having an aperture stop; an imaging element adapted to obtain image data based on received light; and a microlens array provided in the focal plane of the imaging lens between the imaging lens and imaging element, the microlens array including a plurality of microlenses arranged in such a manner that each microlens is associated with a plurality of imaging pixels of the imaging element, wherein the arrangement of the microlenses of the microlens array is corrected from an equidistant arrangement to a non-linear arrangement according to the height of the image from the imaging lens on the imaging element.

5 Claims, 12 Drawing Sheets

IMAGE HEIGHT y ON THE IMAGING ELEMENT

FIG. 18

IMAGE HEIGHT y ON THE IMAGING ELEMENT

IMAGING DEVICE

CROSS REFERENCES TO RELATED APPLICATIONS

The present application claims priority to Japanese Priority Patent Application JP 2009-100187 filed with the Japan Patent Office on Apr. 16, 2009, the entire content of which is hereby incorporated by reference.

BACKGROUND

The present application relates to an imaging device using a microlens array.

A variety of imaging devices have been proposed and developed to date. Some of the imaging devices proposed are designed to perform predetermined image processing on image data, obtained as a result of imaging, before outputting the data.

For example, PCT Patent Publication No. 06/039486 Pamphlet and Ren. Ng. and seven others, "Light Field Photography with a Hand-Held Plenoptic Camera," Stanford Tech Report CTSR 2005-02 propose an imaging device based on a method called "light field photography." This imaging device includes an imaging lens, microlens array, imaging element and image processing section. The imaging lens has an aperture stop with a single aperture at the center. Thanks to such a configuration, the image data obtained from the imaging element contains information about the direction of travel of light in addition to the intensity distribution of the light on the light-receiving surface. The image processing section can reconstruct an observation image from an arbitrary viewpoint or direction (hereinafter simply referred to as a field of view).

SUMMARY

Incidentally, the microlens array includes a plurality of microlenses. A plurality of pixels of the imaging element are assigned to each of the microlenses. If the above method is used, the number of pixels of the reconstructed image is equal to that of microlenses of the microlens array. The reason for this is that the two-dimensional coordinate information of the reconstructed image is determined by the coordinates of the microlens array. As a result, the number of pixels in the two-dimensional coordinates of the reconstructed image is calculated by dividing the total number of pixels of the imaging element by the number of pixels assigned to each of the microlenses. On the other hand, the number of pixels assigned to each of the microlenses is equal to the resolution of ray angle information and determines the resolution in an arbitrary field of view of the reconstructed image, i.e., from how many viewpoints or directions the image is reconstructed. Therefore, the resolution in an arbitrary field of view and the number of pixels in the two-dimensional coordinates are in a tradeoff relationship.

Here, if the above method is used, the image data contains information about the direction of travel of light in addition to the intensity distribution of the light. It is essential, therefore, that each ray should be described separately. With this method, however, the position of each image (image projected through the aperture stop of the main lens e.g., circular image) formed on the imaging element for each microlens changes depending on the angle of the principal ray when the rays that have passed through the aperture stop of the main lens converge as they travel toward the imaging element. That is, the positional relationship between each microlens and the image produced thereby varies depending on the angle of the principal ray. If the microlens-to-microlens pitch is an integer multiple of the pitch between light-receiving pixels, the position of the image produced by each microlens relative to the light-receiving pixel changes. As a result, refocused image, arbitrary viewpoint image and other reconstructed images specific to the above method may not be produced.

In light of the foregoing, there is a need for the present application to generate a proper reconstructed image when image data is obtained in such a manner as to contain information about the direction of travel of light.

An imaging device according to an embodiment includes an imaging lens, an imaging element and a microlens array section. The imaging lens has an aperture stop. The imaging element obtains image data based on received light. The microlens array section is provided in the focal plane of the imaging lens between the imaging lens and imaging element. The microlens array section includes a plurality of microlenses arranged in such a manner that each microlens is associated with a plurality of imaging pixels of the imaging element. Further, the arrangement of the microlenses of the microlens array is corrected from an equidistant arrangement to a non-linear arrangement according to the height of the image from the imaging lens on the imaging element.

In the imaging device according to the embodiment, the image of a target produced by the imaging lens is formed on the microlens array. Then, as incident rays which have entered the microlens array reach the imaging element and are received by a plurality of imaging pixels associated with each of the microlenses, image data containing the direction of travel of light is obtained. Here, the arrangement of the microlenses of the microlens array is corrected from an equidistant arrangement to a non-linear arrangement according to the height of the image from the imaging lens on the imaging element. As a result, even if, for example, the incidence angle of the principal ray reaching the imaging element changes non-linearly with the image height (e.g., imaging device with an optical system having a short focal length and a lens not satisfying the sine condition), it is possible to avoid image height deviation on the light-receiving surface of the imaging element in the image data obtained from the imaging element.

In the imaging device according to the embodiment, the arrangement of the microlenses of the microlens array is corrected from an equidistant arrangement to a non-linear arrangement according to the height of the image from the imaging lens on the imaging element. This makes it possible to avoid image height deviation on the light-receiving surface of the imaging element in the image data obtained from the imaging element. Therefore, a proper reconstructed image can be generated using image data when the image data is obtained in such a manner as to contain information about the direction of travel of light.

Additional features and advantages are described herein, and will be apparent from the following Detailed Description and the figures.

DETAILED DESCRIPTION

Figure 1:
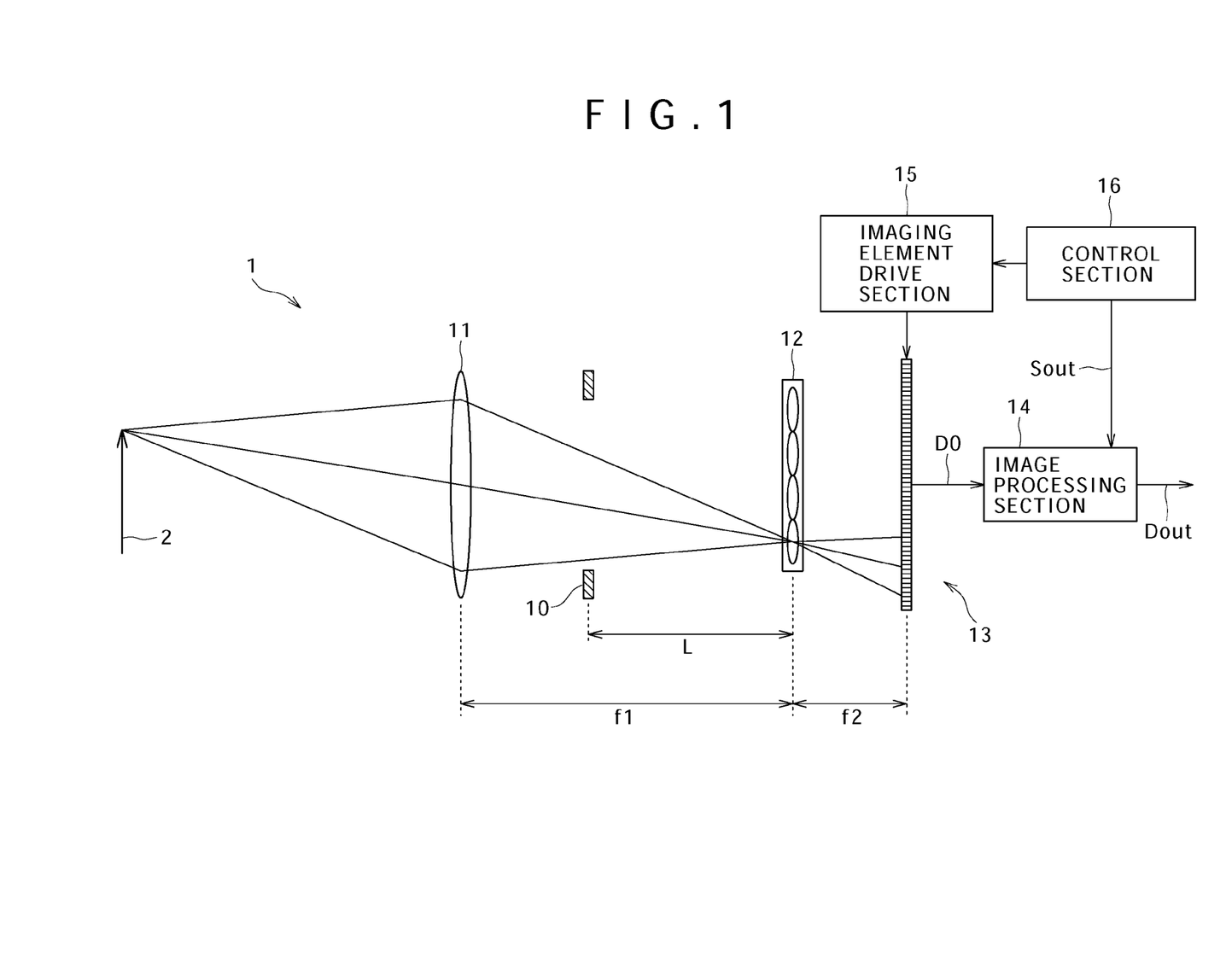
FIG. 1 is a diagram illustrating an overall configuration of an imaging device according to an embodiment.

A detailed description will be given below of an embodiment of the present application with reference to the accompanying drawings. It should be noted that the description will be given in the following order:

1. Embodiment (correction of the arrangement of the microlenses to a non-linear arrangement to avoid image height deviation)
2. Modification example 1. Embodiment Example of Overall Configuration of the Imaging Device FIG. 1 is a diagram illustrating an overall configuration of an imaging device according to an embodiment (imaging device 1). The imaging device 1 is designed to capture an image of a subject 2 and output image data Dout. The same device 1 includes, from the side of the subject 2, an imaging lens 11, aperture stop 10, microlens array 12 and imaging element 13. The same device 1 also includes an image processing section 14, imaging element drive section 15 and control section 16.

The imaging lens 11 is a main lens adapted to capture an image of the subject and includes a common imaging lens used, for example, in a video camcorder or still camera.

Figure 2:
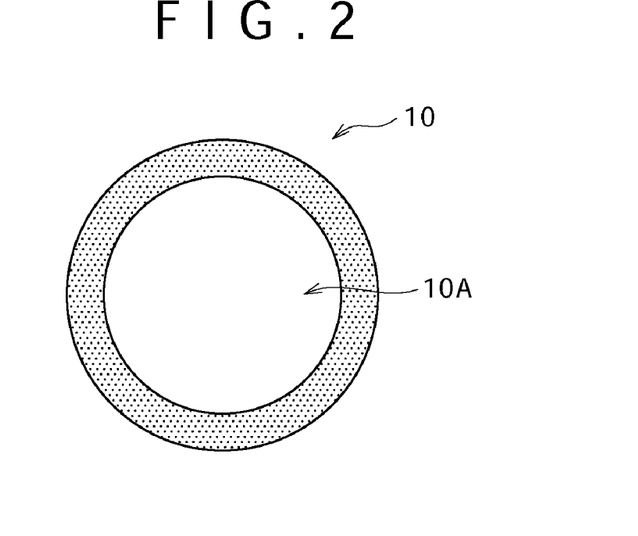
FIG. 2 is a plan view illustrating a rough configuration of an aperture stop shown in FIG. 1.

The aperture stop 10 is an optical aperture stop of the imaging lens 11. The aperture stop 10 has a circular opening portion 10A as shown in FIG. 2. Although the details thereof will be described later, all rays passing through the aperture stop 10 hold information about their directions of travel. It should be noted that the aperture stop 10 and microlens array 12 are arranged at a distance L from each other.

Figure 3:
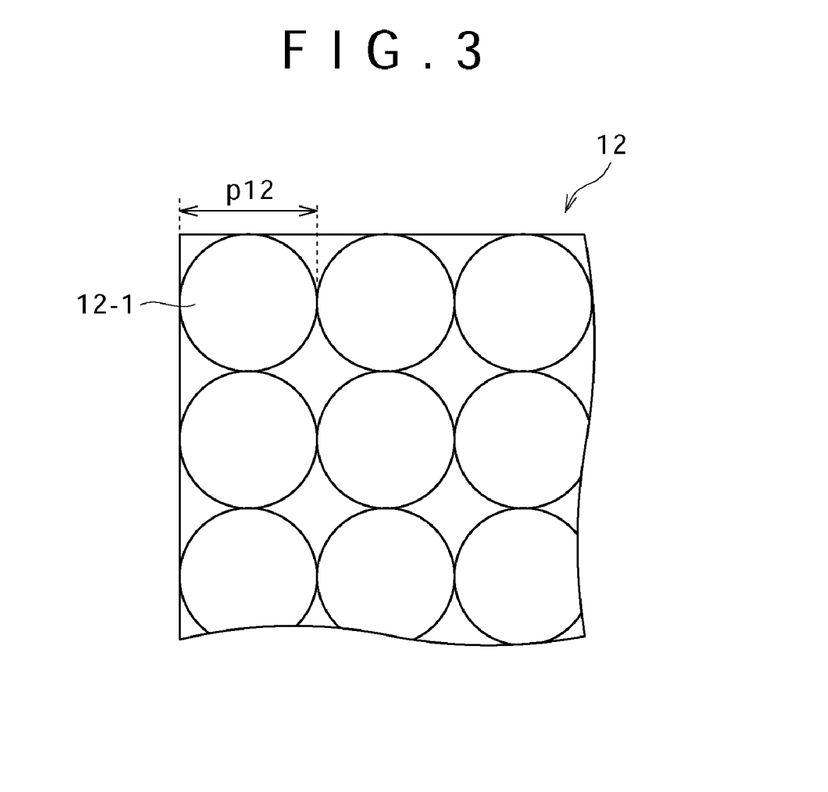
FIG. 3 is a plan view illustrating a rough configuration of a microlens array shown in FIG. 1.

The microlens array 12 has a plurality of microlenses 12-1 arranged two-dimensionally in a matrix form (pitch between the microlenses 12-1: p12) as illustrated in FIG. 3. The microlens array 12 is arranged in an image forming plane of the imaging lens 11 (reference symbol f1 in FIG. 1 denotes the focal length of the imaging lens). Each of the microlenses 12-1 is circular in plan view and includes, for example, a solid, liquid crystal, liquid, or diffractive lens.

Figure 4:
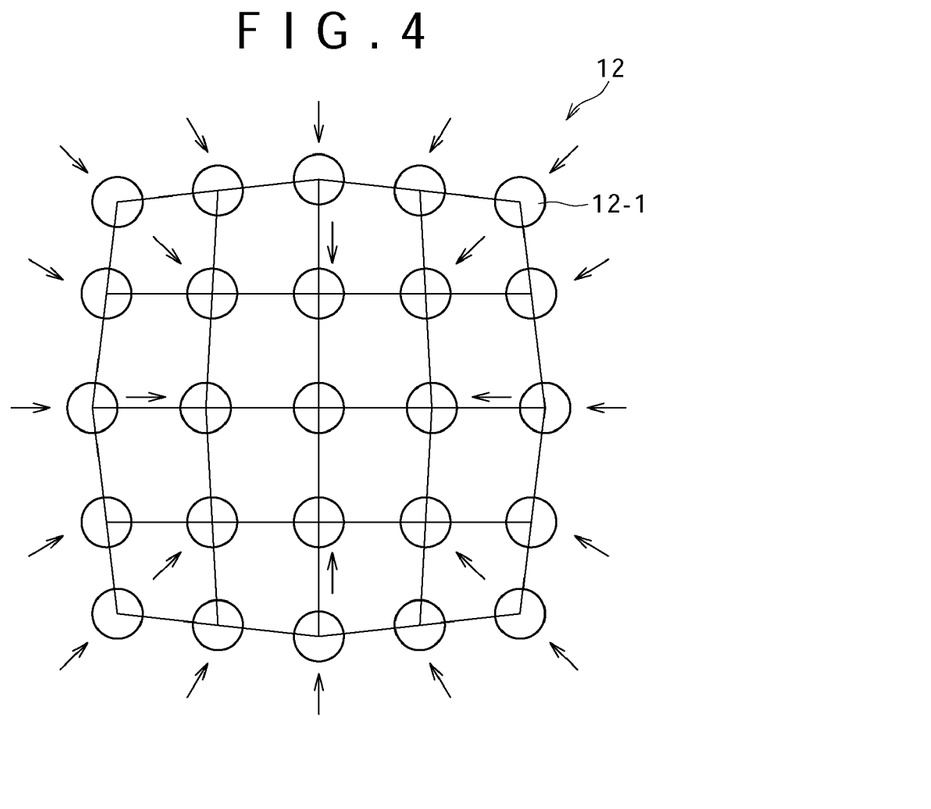
FIG. 4 is a plan view illustrating a detailed configuration example of the microlens array shown in FIG. 1.

Further, the arrangement of the microlenses 12-1 of the microlens array 12 is corrected from an equidistant arrangement to a non-linear arrangement according to a height y of the image from the imaging lens 11 on the imaging element 13, for example, as illustrated by arrows in FIG. 4. That is, a pitch p12 between the microlenses 12-1 changes in a non-linear manner from the center to periphery of the microlens array 12. Although the details thereof will be described later, the arrangement of the microlenses 12-1 is corrected to a non-linear arrangement in the direction in which image height deviation appropriate to the image height y (amount of image height deviation described later $+\Delta$) cancels out. Further, the rate of increase of a correction amount for a non-linear arrangement of the microlenses 12-1 (absolute value of a correction amount $(-\Delta)$ which will be described later) gradually diminishes with increase in the image height y. More specifically, the absolute value of the correction amount $(-\Delta)$ is expressed by the equation given below. Here, f2 denotes the focal length of the microlenses 12-1, and $\theta$ the incidence angle of the principal ray (principal ray L0 which will be described later) reaching the imaging element 13 via the aperture stop 10 and microlenses 12-1. As a result, although the details thereof will be described later, it is possible to avoid image height deviation on the light-receiving surface (surface on the side of the microlens array 12) of the imaging element 13 in the image data (image data D0, described later) obtained from the imaging element 13.

$$\Delta = f2 \times \tan\theta \quad (11)$$

The imaging element 13 is designed to receive light from the microlens array 12 and obtain image data D0. The same element 13 is arranged in the focal plane of the microlens array 12. The imaging element 13 includes a plurality of two-dimensional imaging elements such as CCD (Charge Coupled Device) or CMOS (Complementary Metal-Oxide Semiconductor) imaging elements arranged two-dimensionally in a matrix form.

M-by-N (M and N: integers) imaging pixels (pixels P which will be described later) are arranged two-dimensionally in a matrix form on the light-receiving surface (surface on the side of the microlens array 12) of the imaging element 13 configured as described above. One of the microlenses 12-1 of the microlens array 12 is assigned to the plurality of pixels P. The number of the pixels P on the light-receiving surface is, for example, M×N=3720×2520=9374400. Here, the number of the pixels (m×n) assigned to each of the microlenses 12-1 is related to the resolution in an arbitrary field of view of a reconstructed image. As a result, the resolution in an arbitrary field of view of a reconstructed image improves with increase in the values m and n. On the other hand, (M/m) and (N/n) are related to the number of pixels (resolution) of the reconstructed image. As a result, the number of pixels of the reconstructed image increases with increase in the values (M/m) and (N/n). Therefore, the resolution in an arbitrary field of view of a reconstructed image and the number of pixels of such an image are in a tradeoff relationship.

Figure 5:
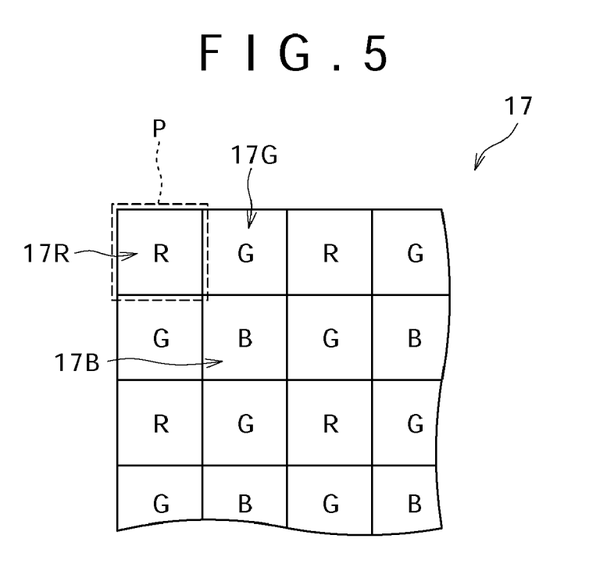
FIG. 5 is a plan view illustrating a rough configuration of a color filter arranged on a light-receiving surface of an imaging element.

Color filters 17 are arranged two-dimensionally on the light-receiving surface of the imaging element 13. The same filters 17 are provided one on each of the pixels P as illustrated in FIG. 5 (not illustrated in FIG. 1). These color filters 17 are arranged in a checkered pattern with the color filters of three primary colors, i.e., red (R), green (G) and blue (B) (red color filters 17R, green color filters 17G and blue color filters 17B), arranged in a 1:2:1 ratio. That is, the same filters 17 are primary color filters in a Bayer pattern. Thanks to the color filters 17 provided on the light-receiving surface of the imaging element 13, the image data D0 obtained from the imaging element 13 provides pixel data (color pixel data) having a plurality of colors (three primary colors in this case) associated with the colors of the color filters 17.

The image processing section 14 subjects the image data D0 obtained from the imaging element 13 to predetermined image processing (image processing including sorting) which will be described later and outputs the processed image data Dout. More specifically, it is possible to synthesize an image set, for example, at an arbitrary focal point (reconstructed image based on the image data Dout) by performing a refocusing arithmetic operation based on a method called "light field photography." It should be noted that a description will be given later of the detailed configuration of the image processing section 14 and the details of the refocusing arithmetic operation.

The imaging element drive section 15 drives the imaging element 13 and controls its light reception operation.

The control section 16 controls the operation of the image processing section 14 and imaging element drive section 15. The same section 16 includes, for example, a microcomputer.

Detailed Configuration Example of the Image Processing Section

Figure 6:
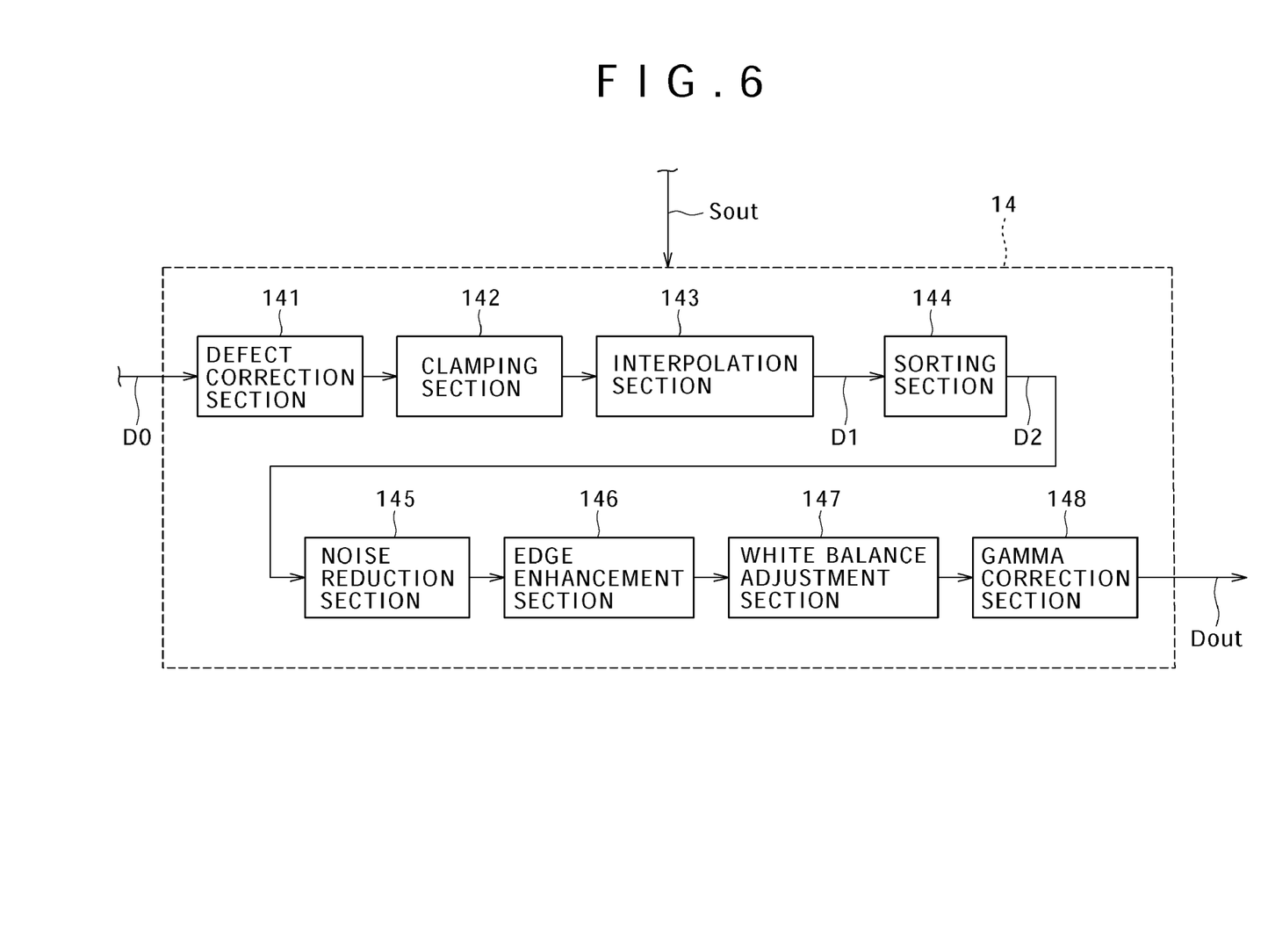
FIG. 6 is a functional block diagram illustrating a configuration example of an image processing section shown in FIG. 1.

A description will be given next of the detailed configuration of the image processing section 14 with reference to FIG. 6. FIG. 6 illustrates a functional block configuration of the image processing section 14.

The image processing section 14 includes a defect correction section 141, clamping section 142, interpolation section 143, sorting section 144, noise reduction section 145, edge enhancement section 146, white balance adjustment section 147 and gamma correction section 148.

The defect correction section 141 corrects a defect such as underexposure (defect caused by an anomaly of the imaging element 13 itself) in the image data D0. The clamping section 142 sets the black level (performs clamping) of each piece of the pixel data in the image data whose defects has been corrected by the defect correction section 141.

The interpolation section 143 performs interpolation such as demosaicing for common Bayer pattern on the image data supplied from the clamping section 142, thus generating interpolated image data D1.

The sorting section 144 performs predetermined sorting of the image data D1 supplied from the interpolation section 143 (sorting of the pixel data), thus generating image data D2. Such sorting allows, for example, for synthesis of a reconstructed image set at an arbitrary focal point. It should be noted that the sorting performed by the sorting section 144 will be described in detail later.

The noise reduction section 145 reduces noise from the image data D2 supplied from the sorting section 144 (e.g., noise which develops during image capture at a dark location or location with insufficient sensitivity). The edge enhancement section 146 performs edge enhancement adapted to enhance the edges of the image data supplied from the noise reduction section 145.

The white balance adjustment section 147 performs the following process on the image data supplied from the edge enhancement section 146 (image data containing equal numbers of pieces of red, green and blue pixel data). That is, the same section 147 performs color balance adjustment (white balance adjustment) to adjust an improper color balance caused by the transmission characteristic of the color filters 17, device-to-device differences including spectral sensitivity of the imaging element 13, illumination condition and other conditions.

The gamma correction section 148 performs predetermined gamma correction on the image data supplied from the white balance adjustment section 147, thus generating the image data Dout.

Action and Effect of the Imaging Device

A detailed description will be given below of the action and effect of the imaging device 1 according to the present embodiment.

Basic Operation

Figure 7A:
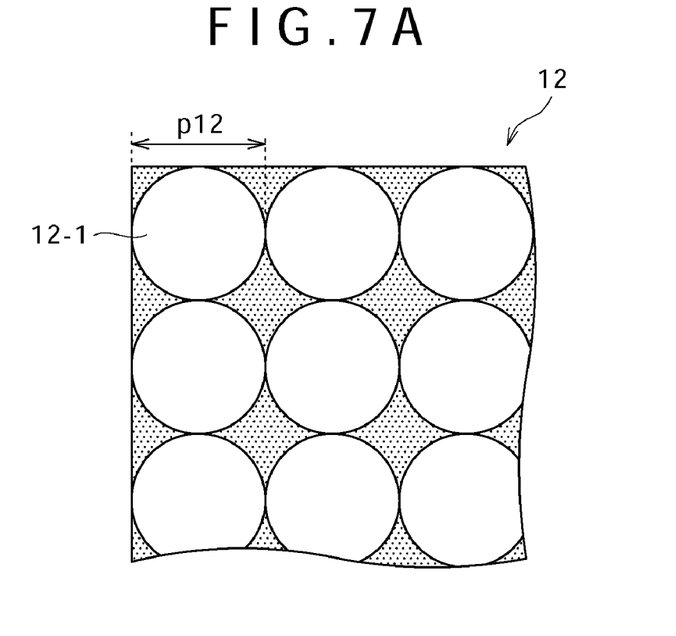
FIGS. 7A and 7B are plan views for describing imaging patterns in the microlens array and imaging element.
Figure 7B:
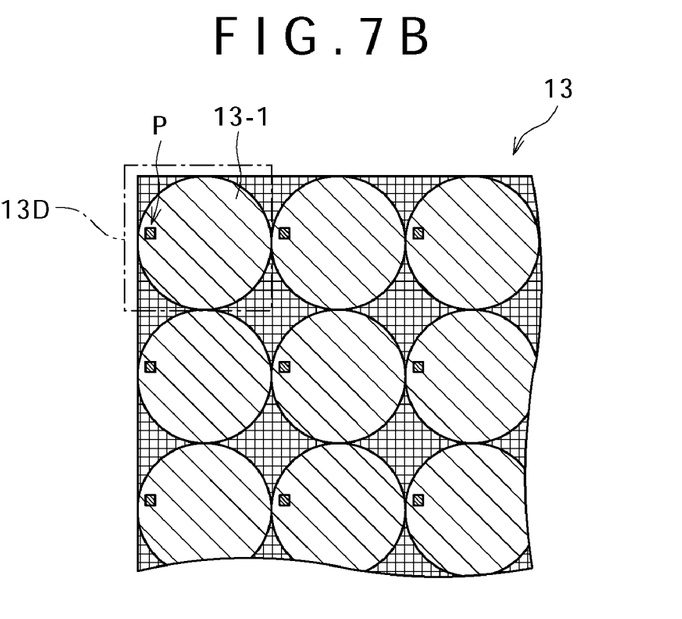

In the imaging device 1, an image of the subject 2 captured by the imaging lens 11 is formed on the microlens array 12 in a shape matching that of the microlens 12-1 (circular), as illustrated in FIG. 7A. Incident rays which have entered the microlens array 12 reach the imaging element 13 via the same array 12 and are received by light-receiving areas 13-1 on which the circular shape of the aperture stop 10 is projected. This allows for the imaging element 13 to obtain the image data D0. At this time, the rays incident on the microlens array 12 are received at different positions of the imaging element 13 according to their directions of incidence. More specifically, the directions of incidence of the rays are determined by the positions of the pixels P assigned to each of the microlenses 12-1. It should be noted that the area (reconstructed image area 13D) in which the pixels P, assigned to each of the microlenses 12-1, are arranged, is equivalent to one pixel of a reconstructed image.

Next, the image data D0 obtained by the imaging element 13 is fed to the image processing section 14. In the same section 14, the image data D0 is subjected to predetermined image processing (e.g., above-described refocusing arithmetic operation). As a result, the processed image data Dout is output from the imaging device 1 as output data (image data of the reconstructed image).

Refocusing Arithmetic Operation

Here, a description will be given below of an example of image processing operation performed by the image processing section 14 (refocusing arithmetic operation) with reference to FIGS. 8 to 13.

Figure 8:
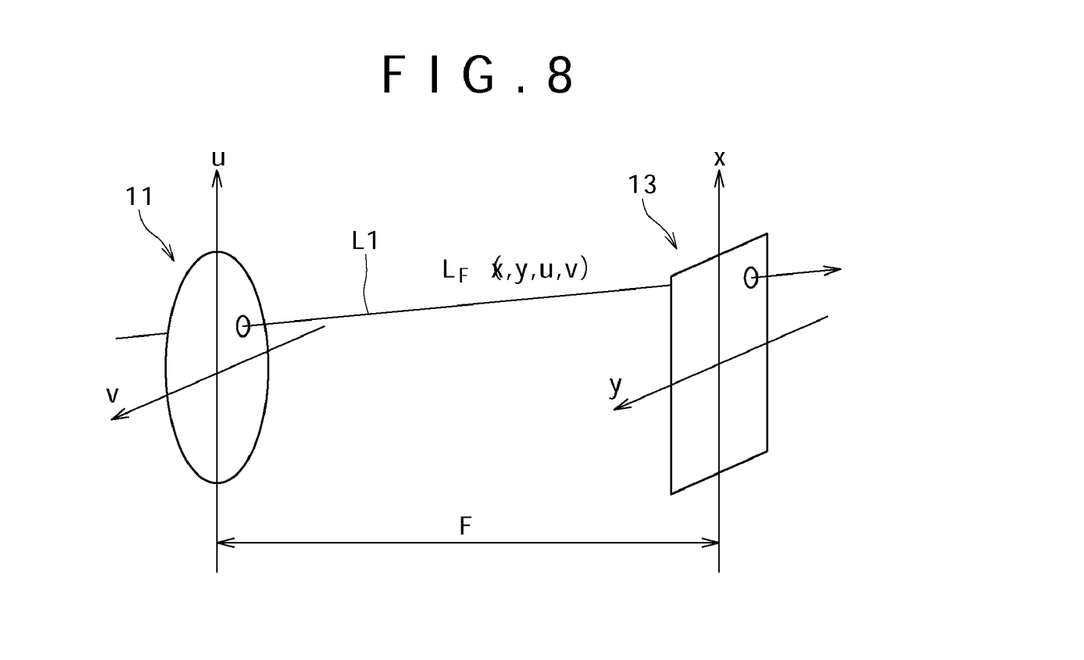
FIG. 8 is a schematic perspective view for describing an example of image processing performed by the image processing section.

First, we consider two rectangular coordinate systems, one (u, v) on the surface of the imaging lens 11 and another (x, y) on the imaging surface of the imaging element 13 as illustrated in FIG. 8. We let the distance between the surface of the imaging lens 11 and the imaging surface of the imaging element 13 be denoted by F. In this case, a ray L1 passing through the imaging lens 11 and imaging element 13 can be expressed by a four dimensional function $L_F$(x, y, u, v). As a result, not only the positional information of the ray but also its direction of travel are recorded on the imaging element 13. That is, the incidence direction of the ray is determined by the arrangement of the plurality of pixels P assigned to each of the microlenses 12-1.

Figure 9:
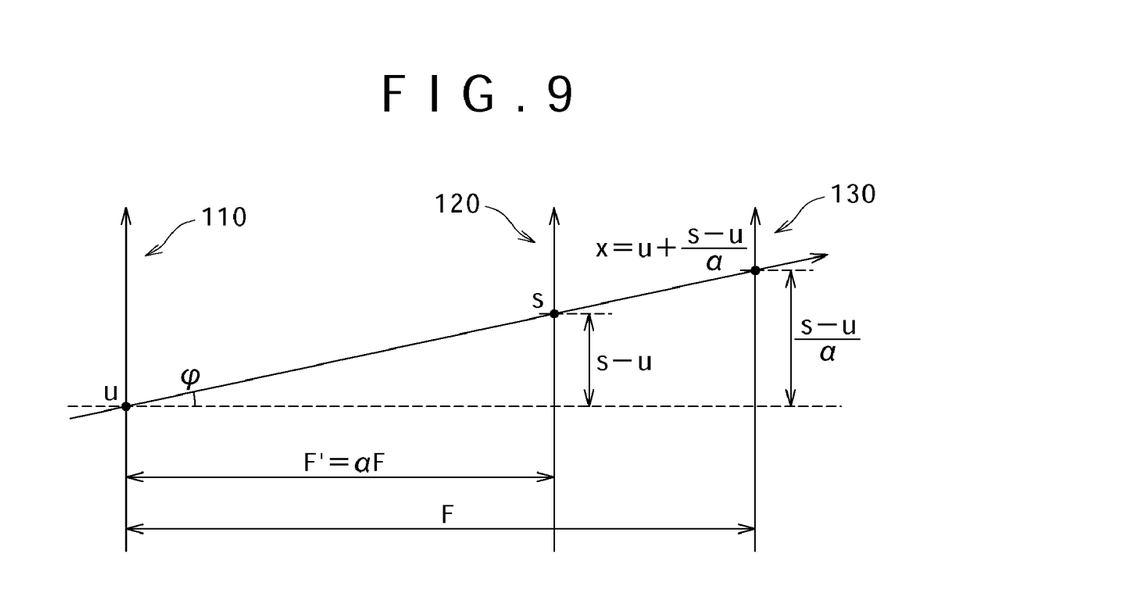
FIG. 9 is a schematic sectional view for describing a refocusing arithmetic operation performed by the image processing section.

Further, we consider a case in which the positional relationship between an imaging lens surface 110, imaging surface 130 and refocus plane 120 is set (a case in which the position of the refocus plane 120 is set so that F'=αF) in this condition as illustrated in FIG. 9. In this case, a detection intensity $L_{F'}$ of the ray on the imaging surface 130 is expressed by Equation 12 shown below when the ray passes through the coordinates (s, t) of the refocus plane 120. Further, an image $E_{F'}$ (s, t) on the refocus plane 120 is found by integrating the detection intensity $L_{F'}$ with respect to the lens diameter. As a result, the image $E_{F'}$ (s, t) is expressed by Equation 13 shown below. Hence, an image set at an arbitrary focal point (refocus plane 120) is reconstructed based on the image data Dout by performing a refocusing arithmetic operation using Equation 13.

[Formula 1]

$$L_{F'}(s, t, u, v) = L_{(\alpha \cdot F)}(s, t, u, v) \quad (12)$$
$$= L_F\left(u + \frac{s-u}{\alpha}, v + \frac{t-v}{\alpha}, u, v\right)$$
$$= L_F\left\{u\left(1 - \frac{1}{\alpha}\right) + \frac{s}{\alpha}, v\left(1 - \frac{1}{\alpha}\right) + \frac{t}{\alpha}, u, v\right\}$$

$$E_{F'}(s, t) = \frac{1}{F'^2} \int\int L_{F'}(s, t, u, v) du dv \quad (13)$$
$$= \frac{1}{\alpha^2 F^2} \int\int L_F\left\{u\left(1 - \frac{1}{\alpha}\right) + \frac{s}{\alpha},\right.$$
$$\left. v\left(1 - \frac{1}{\alpha}\right) + \frac{t}{\alpha}, u, v\right\} du dv$$

More specifically, the image processing section 14 performs defect correction on the image data D0 supplied from the imaging element 13 at the defect correction section 141 as illustrated in FIG. 6 first, followed by the clamping by the clamping section 142 and the interpolation by the interpolation section 143. Thereafter, the sorting section 144 performs sorting of the image data D1, thus generating the image data D2 from the image data D1.

Figure 10:
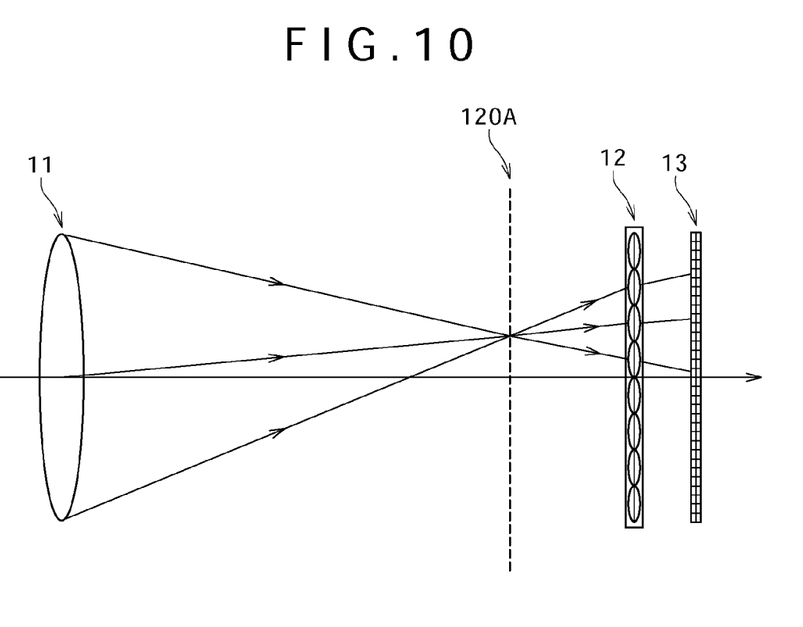
FIG. 10 is a schematic sectional view illustrating an example of set position of a refocus plane in the refocusing arithmetic operation.

Here, in order to generate a reconstructed image having a focal point relocated more toward the back (farther) than that located during image capture (position of the microlens array 12) in the refocusing arithmetic operation performed by the image processing section 14, the following sorting is performed. More specifically, sorting is performed, for example, in such a manner that the rays are selectively extracted as illustrated in FIG. 10. That is, the image of the subject having a focal point located more toward the back than that located during image capture is formed between the imaging lens 11 and microlens array 12. Therefore, the rays converge once and then diverge again, passing through the different microlenses 12-1 depending on their directions of travel and eventually reaching the imaging element 13. Therefore, as illustrated, for example, in FIG. 12, the pixel data is sorted in such a manner that the pixel data D10 associated with these rays is selectively extracted from the plurality of reconstructed image areas 13D which differ from each other.

Figure 11:
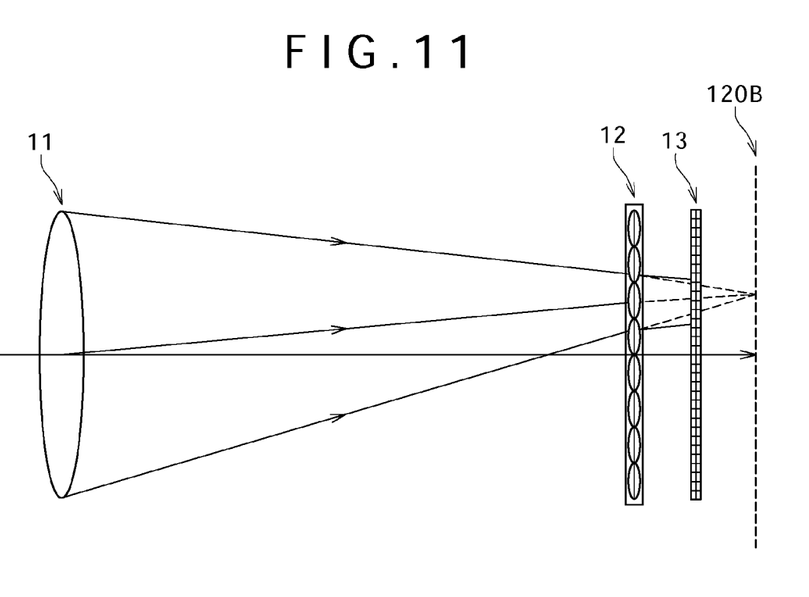
FIG. 11 is a schematic sectional view illustrating another example of set position of the refocus plane in the refocusing arithmetic operation.
Figure 12:
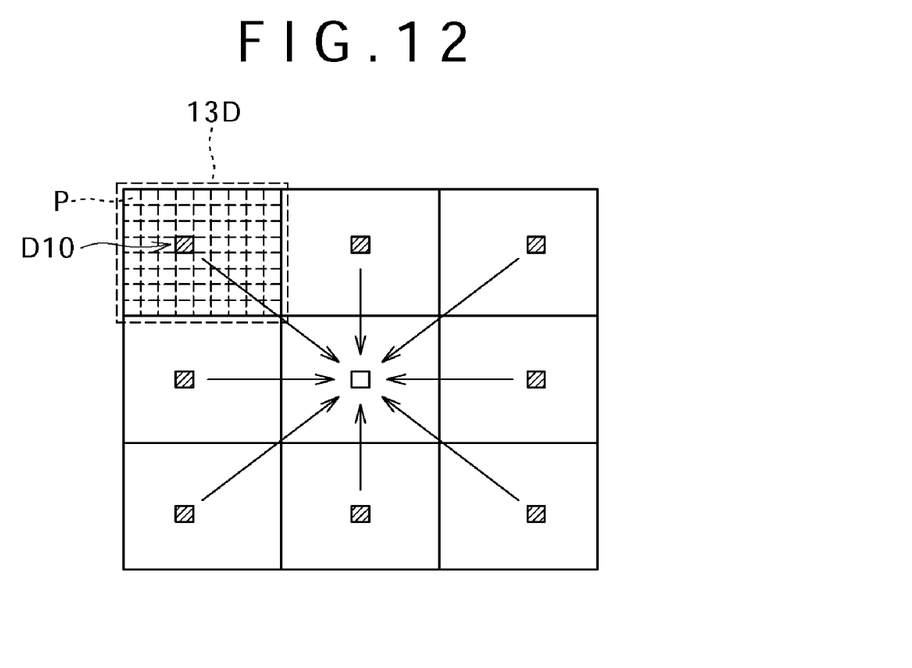
FIG. 12 is a schematic plan view illustrating an example of sorting in the refocusing arithmetic operation shown in FIG. 10.
Figure 13:
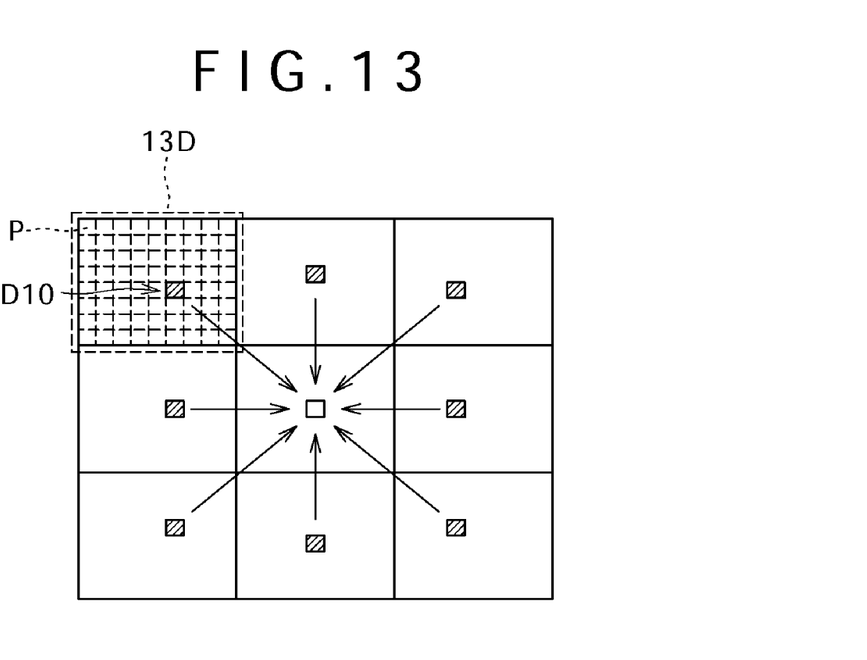
FIG. 13 is a schematic plan view illustrating another example of sorting in the refocusing arithmetic operation shown in FIG. 11.

On the other hand, in order to generate a reconstructed image having a focal point relocated more toward the front (closer) than that located during image capture, the following sorting is performed. More specifically, sorting is performed, for example, in such a manner that the rays are selectively extracted as illustrated in FIG. 11. That is, the image of the subject having a focal point located more toward the front than that located during image capture is formed more toward the back than the microlens array 12. As a result, the rays do not form any image within the imaging device 1. Instead, the rays pass through the different microlenses 12-1 depending on their directions of travel and eventually reach the imaging element 13. Therefore, as illustrated, for example, in FIG. 13, the pixel data is sorted in such a manner that the pixel data D10 associated with these rays is selectively extracted from the plurality of reconstructed image areas 13D which differ from each other.

Next, the noise reduction section 145 reduces noise from the image data D2 which has been sorted as described above, followed by the edge enhancement by the edge enhancement section 146 and the color balance adjustment by the white balance adjustment section 147. This provides image data whose color balance has been adjusted. Thereafter, the gamma correction section 148 performs gamma correction on the image data supplied from the white balance adjustment section 147. As a result, the resultant data is output from the image processing section 14 as the image data Dout. This allows for an image set at an arbitrary focal point (refocus plane 120) to be reconstructed based on the image data Dout.

Characteristic Action

Figure 14:
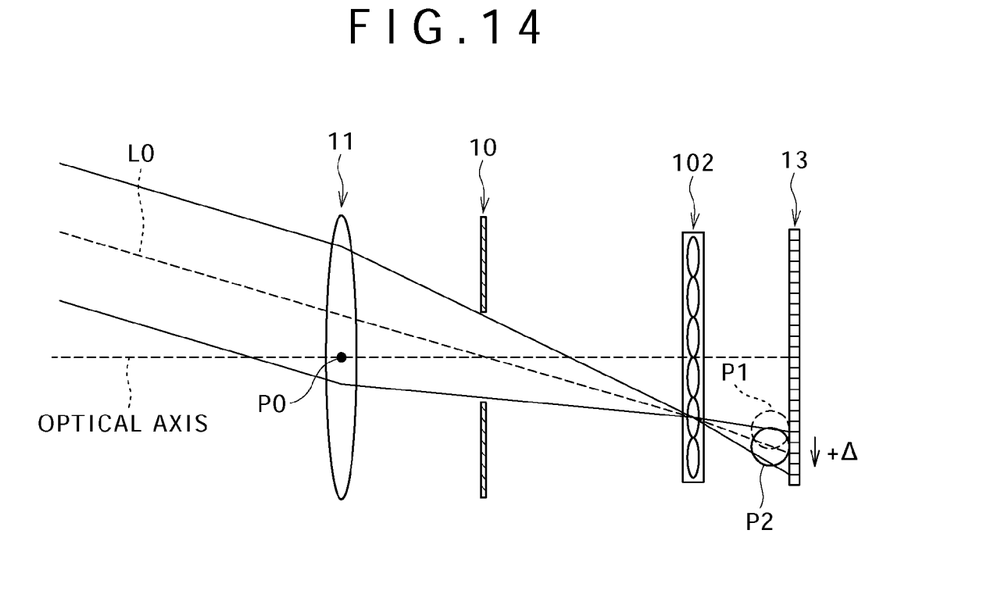
FIG. 14 is a diagram for describing image height deviation in the imaging device according to a comparative example.

A detailed description will be given next of the characteristic action of the imaging device 1 with reference to FIGS. 14 to 18 by way of comparison with a comparative example. Here, FIG. 14 illustrates major components of an imaging device according to the comparative example (imaging device having a microlens array 102 in which the positions of the microlenses 12-1 are not corrected to the above-mentioned non-linear arrangement). More specifically, FIG. 14 illustrates how the imaging device according to the comparative example captures an image in the presence of an image height deviation (amount of image height deviation described later (+Δ)>0).

Comparative Example

First, if the principal ray L0 of all the rays passing through the aperture stop 10 of the imaging lens 11, i.e., the main lens, is inclined relative to the optical axis, for example, as illustrated in FIG. 14, the image height deviation Δ occurs (amount of image height deviation (+Δ)) dependently on the angle of the principal ray L0. That is, the image formed on the imaging element 13 in a shape matching that of the microlens 12-1 (circular) moves from the position denoted by reference symbol P1 to that denoted by reference symbol P2 as illustrated by an arrow in FIG. 14.

Figure 15:
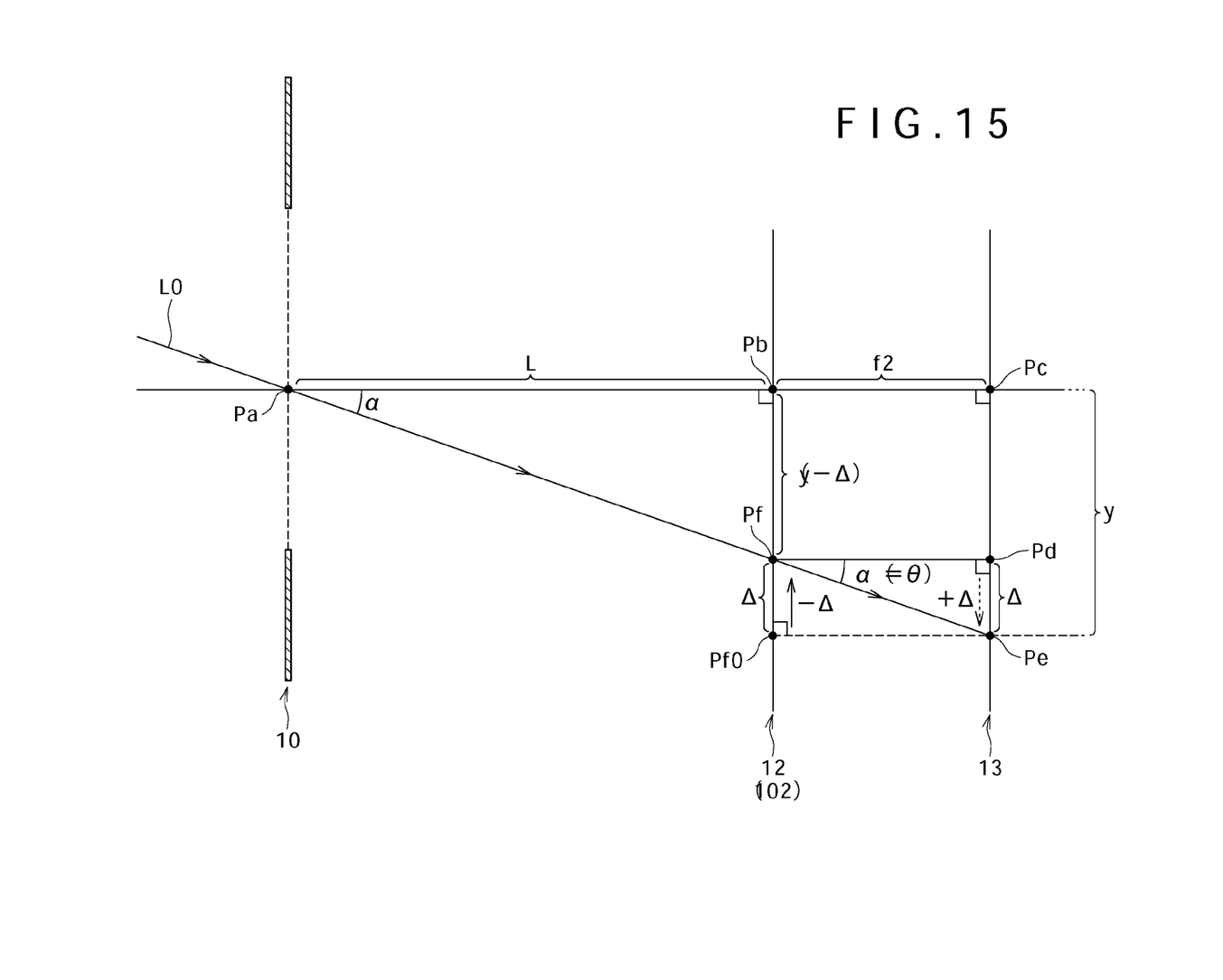
FIG. 15 is a schematic diagram for describing the details of the image height deviation and the outline of correction of the image height deviation.

More specifically, as illustrated in FIG. 15, an image height deviation (refer to the dashed line arrow in FIG. 15) occurs due to the amount of image height deviation (+Δ) (distance between points Pd and Pe) on the light-receiving surface (surface on the side of the microlens array 12) of the imaging element 13. This amount of image height deviation (+Δ) is expressed by Equations 14 and 15 shown below. In these equations, α denotes the inclination angle between the optical axis and principal ray L0, y the height of the image formed by the principal ray L0 on the imaging element 13 (distance between points Pc and Pe), and L the distance between the aperture stop 10 and microlens array 12 (distance between points Pa and Pb). Further, f2 denotes the focal length of the microlens 12-1 (distance between points Pb and Pc), and θ the incidence angle of the principal ray L0 reaching the imaging element 13 via the aperture stop 10 and microlens 12-1 (here θ=α).

$$\tan \alpha = \{(y-\Delta)/L\}\} = (\Delta/f2) \quad (14)$$

$$\Delta = [\{(y-\Delta) \times f2\}/L] = f2 \times \tan \theta \quad (15)$$

Thus, in the imaging device according to the comparative example, the position of each unit image formed on the imaging element 13 changes depending on the angle θ (α) of the principal ray L0 as the rays converge toward the imaging element 13 after passing through the aperture stop 10. The microlenses 12-1 of the microlens array 102 are not corrected to non-linear positions as in the present embodiment, resulting in an image height deviation caused by the amount of image height deviation Δ expressed by Equation 15 shown above. In other words, even if the image data D0 obtained by the imaging element 13 contains information about the direction of travel of light in addition to the intensity distribution of the light as described above, the positions of the unit images of the microlenses 12-1 deviate from the pixels P of the imaging element 13. As a result, the image processing section 14 may not be able to produce a reconstructed image such as refocused or arbitrary viewpoint image.

Present Embodiment

In contrast, in the imaging device 1 according to the present embodiment, the microlenses 12-1 of the microlens array 12 are corrected to non-linear positions from equidistant positions according to the height y of the image from the imaging lens 11 on the imaging element 13 as illustrated, for example, in FIG. 4 and FIG. 15. More specifically, the positions of the microlenses 12-1 are corrected from the point Pf0 to the point Pf (correction amount: −Δ) so that the image height deviation Δ appropriate to the image height y cancels out as illustrated by the solid arrow in FIG. 15. This makes it possible to avoid image height deviation (deviation caused by the amount of image height deviation (+Δ)) on the light-receiving surface (surface on the side of the microlens array 12) of the imaging element 13 in the image data D0 obtained from the imaging element 13.

Figure 16A:
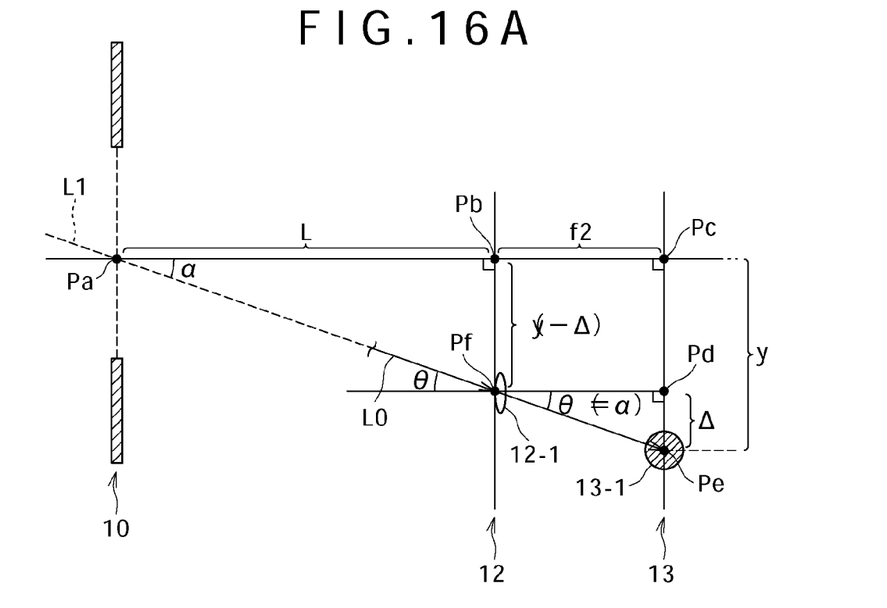
FIGS. 16A and 16B are schematic diagrams for describing the details of correction of the image height deviation (correction to non-linear arrangement) shown in FIG. 15.

It should be noted, however, that the incidence angle θ of the principal ray L0 reaching the imaging element 13 may not always change linearly with the image height y (when θ=α, e.g., imaging device with a small optical system) as illustrated in FIGS. 15 and 16A. That is, if the incidence angle θ of the principal ray L0 changes non-linearly with the image height y as illustrated, for example, in FIGS. 16B and 17 (when not necessarily θ=α, e.g., imaging device with an optical system having a short focal length and a lens not satisfying the sine condition). More specifically, in FIG. 17, the angle θ of the principal ray diminishes gradually rather than changes linearly with increase in the image height y (refer to an arrow in FIG. 17). As a result, θ<α.

Figure 16B:
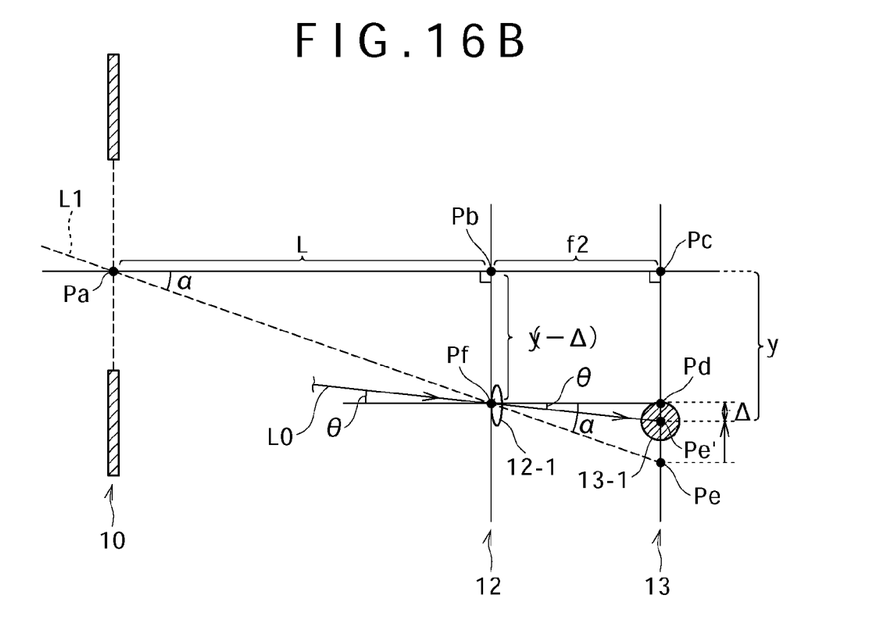
Figure 17:
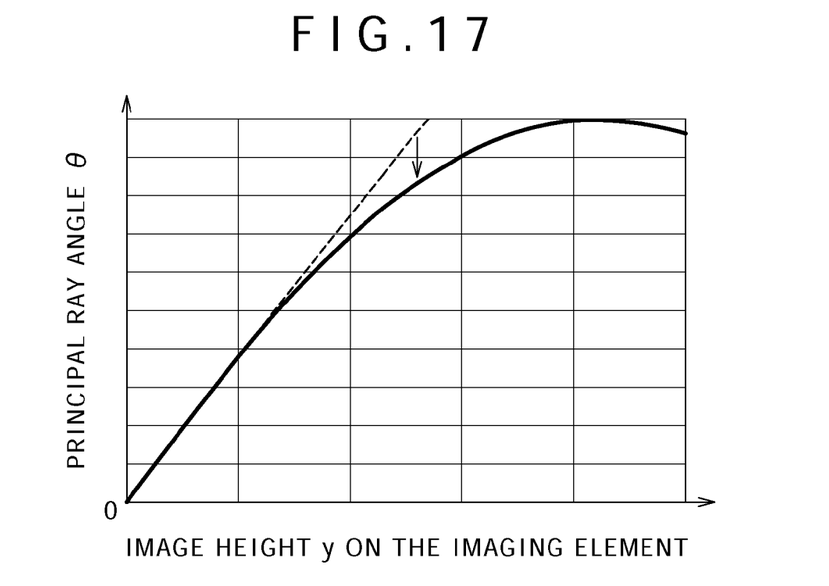
FIG. 17 is a characteristic diagram illustrating an example of relationship between the image height deviation and principal ray angle (non-linearity characteristic)
Figure 18:
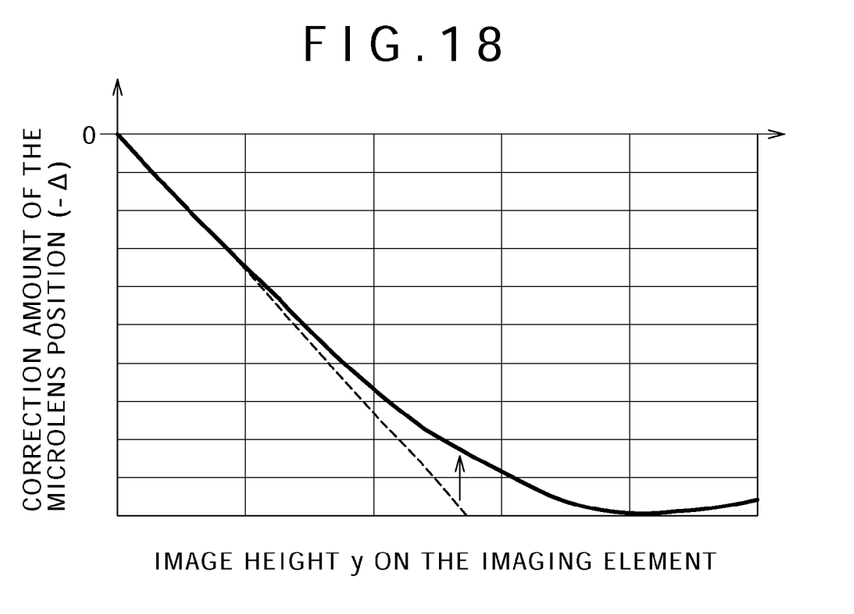
FIG. 18 is a characteristic diagram illustrating an example of relationship between the image height deviation and the shift of the microlens position (non-linearity characteristic).

In the imaging device 1, therefore, the arrangement of the microlenses 12-1 of the microlens array 12 is corrected from an equidistant arrangement to a non-linear arrangement according to the height y of the image from the imaging lens 11 on the imaging element 13, for example, as illustrated in FIGS. 4 and 16B. More specifically, the rate of increase of the correction amount for a non-linear arrangement of the microlenses 12-1 (absolute value of the correction amount (−Δ)) gradually diminishes with increase in the image height y, as illustrated, for example, by an arrow in FIG. 18 and Equation 11. This makes it possible to avoid image height deviation on the light-receiving surface of the imaging element 13 in the image data D0 obtained from the imaging element 13 even in a case illustrated, for example, in FIGS. 16B and 17 (even if the angle θ of the principal ray changes non-linearly with the image height y).

As described above, in the present embodiment, the arrangement of the microlenses 12-1 of the microlens array 12 is corrected from an equidistant arrangement to a non-linear arrangement according to the height y of the image from the imaging lens 11 on the imaging element 13. This makes it possible to avoid image height deviation on the light-receiving surface of the imaging element 13 in the image data D0 obtained from the imaging element 13. This allows for the image processing section 14 to generate a proper reconstructed image using the image data D0 when image data is obtained in such a manner as to contain information about the direction of travel of light.

Further, for example, there is no need to provide any image height correction section adapted to correct the image height in the image processing section 14 because the image height correction is achieved solely by setting the positions of the microlenses 12-1. Therefore, so long as the displacement of the aperture stop 10, anticipated at the time of design of the pitch between the microlenses 12-1 of the microlens array 12, does not occur, a proper reconstructed image can be generated with ease.

2. Modification Example

Although described with reference to an embodiment, the present application is not limited to this embodiment and may be modified in various ways.

For example, the image processing section 14 was described as one of the components of the imaging device in the present embodiment. However, the same section need not be necessarily provided in the imaging device. More specifically, the image processing section may be provided in a device separate from the imaging device such as a PC (Personal Computer) so that image data obtained from the imaging device can be transferred to the PC for image processing.

Further, the aperture stop 10 is arranged on the image side (outgoing side) of the imaging lens in the present embodiment. However, the present application is not limited to this configuration, and the aperture stop 10 may be provided on the subject side (incoming side) of the imaging lens.

Still further, a description was given in the present embodiment by taking, as an example, the Bayer pattern color filters of three primary colors, i.e., red (R), green (G) and blue (B), arranged in a checkered pattern in a 1:2:1 ratio. However, the present application is not limited thereto. That is, color filters in other pattern such as those of complementary colors may be used. Among such complementary color filters are four complementary color filters of yellow (Y), magenta (M), cyan (C) and green (G) arranged in a checkered pattern in a 1:1:1:1 ratio.

In addition, demosaicing was taken as an example of the interpolation performed on the pixel data in the image data. However, other interpolation process may be performed.

Still in addition, in the present embodiment, a description was given of the refocusing arithmetic operation as an example of image processing including sorting performed by the image processing section 14. However, the image processing including sorting is not limited thereto. That is, defocusing or depth of field adjustment may also be used. Further, a plurality of arbitrary viewpoint images may be generated, for example, by extracting and synthesizing pixel data from the pixels at the same positions of the image areas that are formed one for each microlens. Using such a plurality of parallax images makes it possible to calculate the distance to the object imaged based on phase difference between the parallax images or achieve stereoscopic vision by displaying a plurality of the parallax images.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An imaging device, comprising:
   an imaging lens having an aperture stop;
   an imaging element adapted to obtain image data based on received light; and
   a microlens array provided in the focal plane of the imaging lens between the imaging lens and imaging element, the microlens array including a plurality of microlenses arranged in such a manner that each microlens is associated with a plurality of imaging pixels of the imaging element, wherein
   the arrangement of the microlenses of the microlens array is corrected from an equidistant arrangement to a non-linear arrangement according to the height of the image from the imaging lens on the imaging element;
   wherein the arrangement of the microlenses is corrected to the non-linear arrangement in the direction in which image height deviation appropriate to the image height cancels out; and
   wherein the rate of increase of a correction amount for the non-linear arrangement of the microlenses gradually diminishes with increase in the image height.

2. The imaging device of claim 1, comprising:
   an image processing section adapted to subject the image data obtained from the imaging element to predetermined image processing so as to generate a reconstructed image.

3. The imaging device of claim 2, wherein
   the image processing section generates a refocused image based on the image data.

4. The imaging device of claim 2, wherein
   the image processing section generates a plurality of arbitrary viewpoint images as the reconstructed image by extracting and synthesizing pixel data from the pixels at the same positions of the image areas that are formed one for each microlens, based on the image data.

5. The imaging device of claim 3, wherein the refocused image is an image set at an arbitrary focal point.

* * * * *